(12) United States Patent
Hausmann et al.

(10) Patent No.: US 12,395,695 B2
(45) Date of Patent: *Aug. 19, 2025

(54) DYNAMIC INSERTION OF SUPPLEMENTAL AUDIO CONTENT INTO AUDIO RECORDINGS AT REQUEST TIME

(71) Applicant: Google LLC, Mountain View, CA (US)

(72) Inventors: Rachel Hausmann, Mountain View, CA (US); Collin Irwin, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/585,962

(22) Filed: Feb. 23, 2024

(65) Prior Publication Data

US 2024/0196048 A1    Jun. 13, 2024

Related U.S. Application Data

(63) Continuation of application No. 16/621,334, filed as application No. PCT/US2019/063317 on Nov. 26, 2019, now Pat. No. 11,949,946.

(51) Int. Cl.
*H04N 21/439* (2011.01)
*G06F 16/61* (2019.01)
(Continued)

(52) U.S. Cl.
CPC ..... *H04N 21/4394* (2013.01); *G10L 15/1822* (2013.01); *G11B 27/029* (2013.01); *H04N 21/2335* (2013.01); *H04N 21/8106* (2013.01)

(58) Field of Classification Search
None
See application file for complete search history.

(56) References Cited

U.S. PATENT DOCUMENTS

| 5,625,570 A | 4/1997 | Vizireanu et al. |
| 6,223,210 B1 | 4/2001 | Hickey |
(Continued)

FOREIGN PATENT DOCUMENTS

| CN | 102945074 | 2/2013 |
| CN | 110192246 | 8/2019 |
(Continued)

OTHER PUBLICATIONS

Machine Translated Chinese Search Report Corresponding to Application No. 201980004868X on Dec. 22, 2023.
(Continued)

*Primary Examiner* — Qin Zhu
(74) *Attorney, Agent, or Firm* — DORITY & MANNING P.A.

(57) ABSTRACT

The present disclosure is generally related to inserting supplemental audio content into primary audio content via digital assistant applications. A data processing system can maintain an audio recording of a content publisher and a content spot marker to specify a content spot that defines a time at which to insert supplemental audio content. The data processing system can receive an input audio signal from a client device. The data processing system can parse the input audio signal to determine that the input audio signal corresponds to a request and can identify the audio recording of the content publisher. The data processing system can identify, responsive to the determination, a content selection parameter. The data processing system can select an audio content item using the content selection parameter. The data processing system can generate and transmit an action data structure including the audio recording inserted with audio content item.

20 Claims, 5 Drawing Sheets

(51) Int. Cl.

| | | |
|---|---|---|
| *G10L 15/18* | (2013.01) | |
| *G10L 15/22* | (2006.01) | |
| *G10L 25/54* | (2013.01) | |
| *G11B 27/029* | (2006.01) | |
| *H04L 51/02* | (2022.01) | |
| *H04L 51/10* | (2022.01) | |
| *H04L 67/02* | (2022.01) | |
| *H04L 67/06* | (2022.01) | |
| *H04N 21/233* | (2011.01) | |
| *H04N 21/235* | (2011.01) | |
| *H04N 21/435* | (2011.01) | |
| *H04N 21/81* | (2011.01) | |

(56) References Cited

U.S. PATENT DOCUMENTS

| | | | |
|---|---|---|---|
| 6,684,249 | B1 | 1/2004 | Frerichs et al. |
| 9,348,554 | B2 | 5/2016 | Story, Jr. et al. |
| 9,367,862 | B2 | 6/2016 | Yruski et al. |
| 9,875,751 | B2 | 1/2018 | Eggerding et al. |
| 11,669,296 | B2 * | 6/2023 | Cassidy .................. G06F 3/16 700/94 |
| 2007/0078709 | A1 | 4/2007 | Rajaram |
| 2009/0210946 | A1 * | 8/2009 | Cohen ................. G06Q 30/0601 705/26.1 |
| 2011/0145370 | A1 * | 6/2011 | Nieuwenhuys .... H04N 7/17354 709/219 |
| 2014/0181243 | A1 * | 6/2014 | Nieuwenhuys ...... H04N 21/812 709/217 |
| 2015/0154632 | A1 | 6/2015 | Jindal et al. |
| 2015/0206168 | A1 | 7/2015 | Boggs et al. |
| 2016/0255377 | A1 * | 9/2016 | Lee ....................... H04N 21/858 725/32 |
| 2017/0131967 | A1 * | 5/2017 | Nieuwenhuys .......... G06F 3/165 |
| 2017/0236524 | A1 | 8/2017 | Ray et al. |
| 2018/0157745 | A1 | 6/2018 | Williams et al. |
| 2019/0278555 | A1 | 9/2019 | Carvajal et al. |
| 2019/0279250 | A1 | 9/2019 | Gordon et al. |
| 2020/0090214 | A1 * | 3/2020 | Tushinskiy .............. G10L 15/22 |
| 2020/0168222 | A1 * | 5/2020 | Saito .................. G06Q 30/0252 |
| 2020/0226642 | A1 * | 7/2020 | Turner .................... G06F 3/165 |

FOREIGN PATENT DOCUMENTS

| | | |
|---|---|---|
| JP | 2003/244677 | 8/2003 |
| JP | 2007/201742 | 8/2007 |
| JP | 2015/029271 | 2/2015 |
| KR | 10-2008-0065282 | 7/2008 |
| KR | 10-2019-0109499 | 9/2019 |
| WO | WO 2011/049235 | 4/2011 |

OTHER PUBLICATIONS

Office Action for KR Application Serial No. 10-2020-7009966, dated Jan. 25, 2021, 15 pages.
International Search Report and Written Opinion for PCT Application Serial No. PCT/US2019/063317, dated Aug. 20, 2020, 16 pages.
Decision of Rejection for Korean Application Serial No. 10-2020-7009966, dated Jul. 1, 2021, 8 pages.
Anonymous, "CRM ReTargeting", 6 pages.
Anonymous, "Dynamic Ad Insertion for Podcasts: Are They Right for Your Show?", Jul. 18, 2019, https://castos.com/dynamic-ad-insertion-for-podcasts/, retrieved on Sep. 27, 2019, 11 pages.

* cited by examiner

DYNAMIC INSERTION OF SUPPLEMENTAL AUDIO CONTENT INTO AUDIO RECORDINGS AT REQUEST TIME

CROSS REFERENCES TO RELATED APPLICATIONS

The present application is a continuation of U.S. application Ser. No. 16/621,334 having a filing date of Dec. 11, 2019, which is a national stage application under 35 U.S.C. § 371 of International Application No. PCT/US2019/063317, titled "DYNAMIC INSERTION OF SUPPLEMENTAL AUDIO CONTENT INTO AUDIO RECORDINGS AT REQUEST TIME," filed Nov. 26, 2019. Applicant claims priority to and the benefit of each of such applications and incorporates all such applications herein by reference in its entirety.

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, users may provide commands, queries, and/or requests (collectively referred to herein as "queries") using free form natural language input which may include vocal utterances converted into text and then processed and/or typed free form natural language input.

SUMMARY

According to an aspect of the disclosure, a system to insert supplemental audio content into primary audio content via digital assistant applications can include a record indexer component executed on a data processing system having one or more processors. The record indexer can maintain, on a database, an audio recording of a content publisher and a content spot marker set by the content publisher to specify a content spot that defines a time at which to insert supplemental audio content during presentation of the audio recording. The system can include a natural language processor component executed on the data processing system. The natural language processor component can receive an audio data packet including an input audio signal that is detected by a sensor of a client device. The natural language processor component can parse the input audio signal from the audio data packet to determine that the input audio signal corresponds to a request for the audio recording from the content publisher. The natural language processor component can identify, based on the request determined from the input audio signal, the audio recording of the content publisher from the database. The system can include a content placement component executed on the data processing system. The content placement component can identify, responsive to the determination that the input audio signal corresponds to the request for the audio recording, an identifier associated with the client device as a content selection parameter. The content placement component can select, for the content spot of the audio recording, an audio content item of a content provider from a plurality of audio content items using the content selection parameter. The system can include an action handler component executed on the data processing system. The action handler component can insert the audio content item into the content spot of the audio recording specified by the content spot marker. The action handler component can generate an action data structure including the audio recording inserted with audio content item at the time defined by the content spot marker. The action handler component can transmit the action data structure to the client device to present the audio recording inserted with the audio content item at the content spot.

According to an aspect of the disclosure, a method of inserting supplemental audio content into primary audio content via digital assistant applications can include maintaining, by a data processing system having one or more processors, on a database, an audio recording of a content publisher and a content spot marker set by the content publisher to specify a content spot that defines a time at which to insert supplemental audio content during presentation of the audio recording. The method can include receiving, by the data processing system, an audio data packet including an input audio signal that is detected by a sensor of a client device. The method can include parsing, by the data processing system, the input audio signal from the audio data packet to determine that the input audio signal corresponds to a request for the audio recording from the content publisher. The method can include identifying, by the data processing system, based on the request determined from the input audio signal, the audio recording of the content publisher from the database. The method can include identifying, by the data processing system, responsive to determining that the input audio signal corresponds to the request for the audio recording, an identifier associated with the client device as a content selection parameter. The method can include selecting, by the data processing system, for the content spot of the audio recording, an audio content item of a content provider from a plurality of audio content items using the content selection parameter. The method can include inserting, by the data processing system, the audio content item into the content spot of the audio recording that defines the time specified by the content spot marker. The method can include generating, by the data processing system, an action data structure including the audio recording inserted with audio content item at the time defined by the content spot marker. The method can include transmitting, by the data processing system, the action data structure to the client device to present the audio recording inserted with the audio content item at the content spot.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
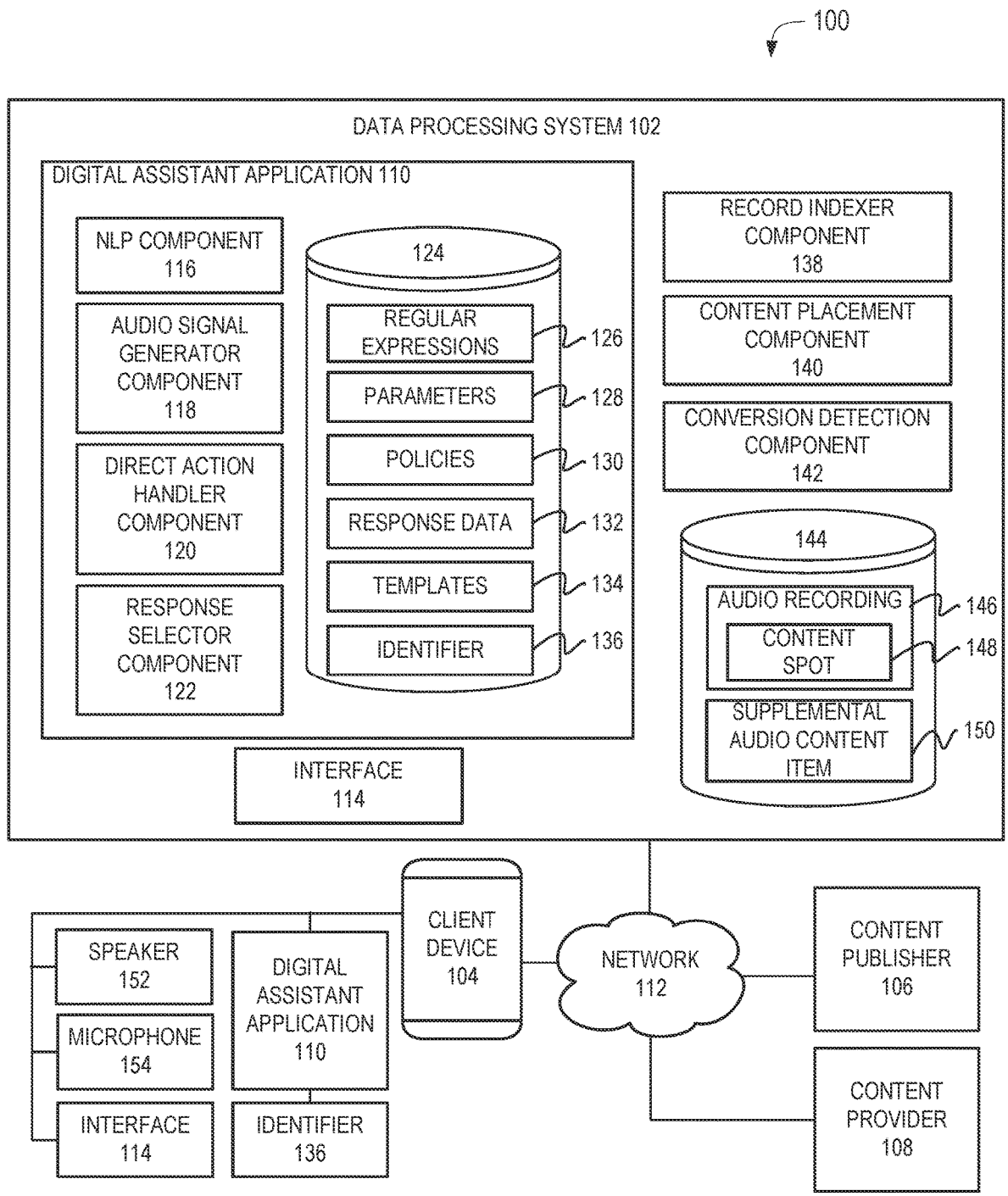
FIG. 1 illustrates a block diagram of an example system to insert supplemental audio content into primary audio content via digital assistant applications, in accordance with an example of the present disclosure.

Following below are more detailed descriptions of various concepts related to and implementations of, methods, apparatuses, and systems to insert supplemental audio content into primary audio content via digital assistant applications. The various concepts introduced above and discussed in greater detail below may be implemented in any of numerous ways.

Audio files can include audio content to be presented via loudspeakers on client devices. To generate the audio content for an audio file, a content publisher can record various sources of sources of sound—natural (e.g., a human voice, an animal, or weather) or artificial (e.g., a musical instrument, a synthesizer, or another machine)—using one or more microphones. For example, to create a podcast recording, the speech of a human announcer continuously reading a transcript can be recorded via a microphone. During the recording, the sounds acquired via the microphones can be sampled, quantized, and encoded to form a digital representation (e.g., binary code) of the sound for the audio content of the audio file. Once made available on an information resource (e.g., a webpage), a client device can download the audio file from the information resource and at a later time play the audio file using a media player.

After the audio file is generated, however, it may be difficult to add supplemental audio content supplied by another entity such as a content provider, without interfering or partitioning the audio content already included in the file. This may be especially problematic in that, unlike streaming content provided in near-real time and thus may be readily interrupted for insertion of such content, the audio file can be played offline sometime after the downloading. One approach to insert the supplemental audio content can involve manually recording the supplemental audio content along with the primary audio content of a content publisher. Continuing from the previous podcast example, the transcript itself read aloud by the human announcer to be recorded may include a part for the supplemental audio content between parts for the primary audio content. But this approach can often lead to listeners of the audio file having to hear the same supplemental audio content frequently without any relevance to them. Further, approaches of this type may not be able to adjust content to dynamically changing or contextually driven technical circumstances, such as the fidelity of the audio equipment used to playback the content, the current audio environment of the listener, and prevailing network conditions, among others.

The lack of adaptation of the supplemental audio content to prevailing circumstances can arise from the absence of a content selection process to account for the requesting client device or the primary audio content in identifying the supplemental audio content to insert. From the perspective of the content provider, without such a process, it may be difficult for the content provider to evaluate or identify which audio file or content publisher to provide the supplemental audio content. As a result, without relevant supplemental audio content, the client devices may consume more computing resources and network bandwidth from the generation and transmission of additional requests for potentially relevant content, as well as providing technically sub-optimal output initially. This can also lead to the degradation of the human-computer interaction (HCI) between the user and the client device playing the audio file.

These technical challenges can be exacerbated in the context of digital assistant applications. A digital assistant application can parse an input voice command acquired via a microphone on the client device to identify a request for audio content from a particular content provider. For example, the input voice command parsed by the digital assistant application may be "Download a podcast from 'News Source A.'" The audio file of the content provider that is provided to the digital assistant application can include the supplemental audio content inserted into the audio file and selected without any content selection process. With digital assistant applications, the generation of additional requests for content can consume a substantially greater amount of computing resources and network bandwidth, due to the use of computationally complex natural language processing algorithms.

To address these and other challenges in inserting supplemental audio content into primary audio content in an audio file, the present systems and methods can dynamically select and insert the supplemental audio content at request time. The audio file can have a content spot specified by the content provider that can define a timespan during which to insert and play the supplemental audio content within the primary audio content. Upon identifying that the voice command is a request for an audio file from a particular content provider, the digital assistant application can invoke a content selection service. The content placement service can identify content selection parameters to be used for selecting from supplemental audio content to insert into the content spot. The content selection parameters can include an identifier, such as a device identifier, a cookie identifier, an account identifier, or an account profile, among others. Using the parameters, the content placement service can identify a supplemental audio content from a set of content from various content providers for the content spot of the audio content in the file. Once identified, the digital assistant application can insert the supplemental audio content into the content spot within the audio content. The digital assistant application can provide and return the audio file with the supplemental audio content to the client device for presentation.

With the incorporation of content selection parameters, additional parameters may be used to augment the selection and identification of supplemental audio content to insert into the content spot of the audio content in the audio file. For example, using the identifier, the digital assistant application can monitor whether one of the predefined interactions (e.g., a voice command query for the content provider) occurs at the client device after the provision of the audio file. Based on the number of client devices at which the predefined interactions are detected, the content selection service can determine a content spot parameter for the content spot within the audio content of the audio file. The value for the content spot parameter can be proportional to a likelihood of occurrence of one of the predefined interactions subsequent to presentation of the audio file with the supplemental audio content. In addition to the content selection parameter, the content selection service can use the content spot parameter to identify the supplemental audio content to insert into the audio content of the file.

Since various parameters are used to select content upon identification of the request, the supplemental audio content inserted into the content spot may be more technically suited to prevailing conditions or may be of more relevance to the user hearing the audio content via the client device. Due to the increase in suitability and/or relevance, a likelihood of a subsequent related interaction via the client device may increase, thereby improving the human-computer interaction (HCI) between the user and the client device. Furthermore, the chances that subsequent voice commands are received by the digital assistant application for additional requests for content can be decreased, thereby reducing the consumption of computing resources and network bandwidth.

FIG. 1, among others, depicts a block diagram of an example system 100 to insert supplemental audio content into primary audio content via digital assistant applications. The system 100 can include at least one data processing system 102. The data processing system 102 can include at least one processor and a memory, i.e., a processing circuit. The memory stores processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 102 can include one or more computing devices or servers that can perform various functions.

The data processing system 102 can include multiple, logically grouped servers and facilitate distributed computing techniques. The logical group of servers may be referred to as a data center, server farm, or a machine farm. The servers can be geographically dispersed. A data center or machine farm may be administered as a single entity, or the machine farm can include a plurality of machine farms. The servers within each machine farm can be heterogeneous-one or more of the servers or machines can operate according to one or more type of operating system platform. The data processing system 102 each can include servers in a data center that are stored in one or more high-density rack systems, along with associated storage systems, located for example in an enterprise data center. In this way, the data processing system 102 with consolidated servers can improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage. Each of the components of the data processing system 102 can include at least one processing unit, server, virtual server, circuit, engine, agent, appliance, or other logic device such as programmable logic arrays configured to communicate and with other computing devices of the system 100.

The system 100 can include at least one client device 104. The client device 104 can include at least one logic device such as a computing device having a processor to communicate with other components of the system 100. The client devices 104 can include an instance of any of the components described in relation to the data processing system 102. The client devices 104 can include a desktop computer, laptop, tablet computer, personal digital assistant, smartphone, mobile device, portable computer, thin client computer, virtual server, speaker-based digital assistant, or other computing device.

The system 100 can include at least one content publisher 106. The content publisher 106 can include servers or other computing devices operated by a content publishing entity to provide primary audio content. For example, the content publisher 106 can be associated with an audio recording entity that records primary audio content. The primary audio content may be a recording of an audio cast (sometimes referred herein as a podcast or an audio podcast). The primary audio content can include one or more breaks defined by the audio recording entity for insertion of other audio content from other entities besides the content publishing entity. The breaks can correspond to a periods (e.g., of silence or other sounds) within the recording in which other content can be inserted. Once recorded, the content publisher 106 can package and generate one or more audio files and make the files available for download via an information resource (e.g., a webpage), a web application, or another program. The audio files can be in any format, such as WAV, MPEG, MP3, RIFF, AAC, OGG, and WMA, among others.

The system 100 can include at least one content provider 108. The content provider 108 can include servers or other computing devices operated by a content provider entity to provide supplemental audio content. For example, the content provider 108 can be associated with another audio recording entity that records supplemental audio content (sometimes referred herein as third-party audio content). The supplemental audio content can be included or inserted into primary audio content created by the content publisher 106. For instance, the supplemental audio content recorded by the content provider 108 in the breaks defined by the audio recording entity associated with the content publisher 106. Once recorded, the content provider 108 can package and generate one or more audio files and make the files available for presentation, in conjunction with the primary audio content, via an information resource (e.g., a webpage), a web application, or another program. The audio files can be in any format, such as WAV, MPEG, MP3, RIFF, AAC, OGG, and WMA, among others.

The system 100 can include at least one network 112. The components of the system 100, such as the data processing system 102, the client device 104, the content publisher 106, and the content provider 108, can communicate over a network 112. The network 112 can include, for example, a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, an NFC (Near-Field Communication) network, a local area network (LAN), a wireless network or a wireline network, and combinations thereof. The network 112 can include a wireless link, such as an infrared channel or satellite band. The topology of the network 112 may include a bus, star, or ring network topology. The network 112 can include mobile telephone networks using any protocol or protocols used to communicate among mobile devices, including advanced mobile phone protocol (AMPS), time division multiple access (TDMA), code-division multiple access (CDMA), global system for mobile communication (GSM), general packet radio services (GPRS), or universal mobile telecommunications system (UMTS). Different types of data may be transmitted via different protocols, or the same types of data may be transmitted via different protocols.

The data processing system 102 can include at least one instance of a digital assistant application 110. The digital assistant application 110 can include at least one natural language processor (NLP) component 116 to parse audio-based inputs. The digital assistant application 110 can include at least one audio signal generator component 118 to generate audio-based signals. The digital assistant application 110 can include at least one direct action handler component 120 to generate action data structures. The digital assistant application 110 can include at least one response selector component 122 to select responses to audio-based input signals. The digital assistant application can include at least one data repository 124 to maintain data for the digital assistant application 110. One or more of the NLP component 116, the audio signal generator component 118, the direct action handler component 120, the response selector component 122, and the data repository 124 can be separate from the instance of the digital assistant application 110 on the data processing system 102 or from one another.

The data repository 124 can include one or more local or distributed databases and can include a database management system. The data repository 124 can include computer data storage or memory and can store one or more regular expressions 126, one or more parameters 128, one or more policies 130, response data 132, templates 134, and at least one identifier 136, among other data. The parameters 128, policies 130, and templates 134 can include information such as rules about a voice based session between the client devices 104 and the data processing system 102. The regular expressions 126 can include rules about conducting the voice-based session between the client devices 104 and the data processing system 102 via the digital assistant application 110. The regular expressions 126, parameters 128, policies 130, and templates 134 can also include information for another digital assistant application 110 received from another source (e.g., the data processing system 102 and the client device 104). The response data 132 can include content items for audio output or associated metadata, as well as input audio messages that can be part of one or more communication sessions with the client device 104. The identifier 138 can include information regarding the client device 104 (e.g., authentication credentials to access and execute the digital assistant application 110).

The data processing system 102 can include at least one record indexer component 138 to receive and maintain audio content from the content publisher 106 and the content provider 108. The data processing system 102 can include at least one content placement component 140 to select supplemental audio content from the content provider 108 for insertion into the primary audio content of the content publisher 106. The data processing system 102 can include at least one conversion detection component 142 to monitor interactions in connection with provision of the audio content. The data processing system 102 can also include at least one data repository 144 to maintain data for the record indexer component 138, the content placement component 140, or the conversion detection component 142, among others. One or more of the record indexer component 138, the content placement component 140, the conversion detection component 142, and the data repository 144 can be separate from the instance of the digital assistant application 110 on the data processing system 102 (e.g., as depicted). One or more of the record indexer component 138, the content placement component 140, the conversion detection component 142, and the data repository 144 can be a part of the instance of the digital assistant application 110 on the data processing system 102.

The data processing system 102 can include at least one interface 114. The interface 114 can be configured, constructed, or operational to receive and transmit information using, for example, data packets. The interface 114 can receive and transmit information using one or more protocols, such as a network protocol. The interface 114 can include a hardware interface, software interface, wired interface, or wireless interface. The interface 114 can be a data interface or a network interface that enables the components of the system 100 to communicate with one another. The interface 114 of the data processing system 102 can provide or transmit one or more data packets that include the action data structure, audio signals, or other data via the network 112. For example, the data processing system 102 can provide the output signal from the data repository 124 or from the audio signal generator component 118 to the client devices 104.

The data processing system 102 can also instruct, via data packet transmissions, the client devices 104 to perform the functions indicated in the action data structure. The output signal can be obtained, generated, transformed to, or transmitted as one or more data packets (or other communications protocol) from the data processing system 102 (or other computing device) to the client devices 104. The interface 114 can facilitate translating or formatting data from one format to another format. For example, the interface 114 can include an application programming interface ("API") that includes definitions for communicating between various components, such as software components. An application, script, program, or other components that are associated with the data processing system 102 can be installed at the client devices 104. The application can enable the client devices 104 to communicate input audio signals (and other data) to the interface 114 of the data processing system 102.

The data processing system 102 can include an application, script, or program installed at the client device 104, such as the instance of the digital assistant application 110 on the client device 104 to communicate input audio signals to the interface 114 of the data processing system 102 and to drive components of the client computing device to render output audio signals or visual output. The data processing system 102 can receive data packets, a digital file, or other signals that include or identify an input audio signal (or input audio signals). The client device 104 can detect the audio signal via the speaker 152 and convert the analog audio signal to a digital file via an analog-to-digital converter. For example, the audio driver can include an analog-to-digital converter component. The pre-processor component can convert the audio signals to a digital file that can be transmitted via data packets over network 112.

The client device 104 can include at least instance of the digital assistant application 110. The functionalities of the data processing system 102, such as the digital assistant application 110, can be included or otherwise be accessible from the client device 104 (e.g., via the interface 114). The functionalities of the data processing system 102 may correspond to the functionalities or interface with the digital assistant application 110 executing on the client devices 104. The client devices 104 can each include and execute a separate instance of the one or more components of the digital assistant application 110. The client devices 104 can otherwise have access to the functionalities of the components of the digital assistant application 110 on the data processing system 102 via the network 112. For example, the client device 104 can include the functionalities of the NLP component 116 and access the remainder of the components of the digital assistant application 110 via the network 112 to the data processing system 102.

The client device 104 can be associated with an end user that enters voice queries as audio input into the client device 104 (via the microphone 154 or speaker 152) and receives audio (or other) output from the data processing system 102 to present, display, or render to the end user of the client device 104. The digital component can include a computer-generated voice that can be provided from the data processing system 102 to the client device 104. The client device 104 can render the computer-generated voice to the end user via the speaker 152. The computer-generated voice can include recordings from a real person or computer-generated language. The client device 104 can provide visual output via a display device communicatively coupled to the client device 104.

The client device 104 can include, interface, or otherwise communicate with at least one speaker 152 and at least one microphone 154. The client device 104 can include an audio driver to provide a software interface with the speaker 152 and the microphone 154. The audio driver can execute instructions provided by the data processing system 102 to control the speaker 152 to generate a corresponding acoustic wave or sound wave. The audio driver can execute an audio file or other instructions to convert an acoustic wave or sound wave acquired from the microphone 154 to generate audio data. For example, the audio driver can execute an analog-to-digital converter (ADC) to transform the acoustic wave or sound wave to the audio data.

The functionalities of the digital assistant application 110 can be allocated or performed by the instance on the data processing system 102 and the client device 104. For example, the instance of the digital assistant application 110 on the client device 104 can detect a keyword and perform an action based on the keyword. The digital assistant application 110 on the client device 104 can be an instance of the digital assistant application 110 executed at the data processing system 102 or can perform any of the functions of the digital assistant application 110. The instance of the digital assistant application 110 on the client device 104 can filter out one or more terms or modify the terms prior to transmitting the terms as data to the data processing system 102 (e.g., the instance of the digital assistant application 110 on the data processing system 102) for further processing. The instance of the digital assistant application 110 on the client device 104 can convert the analog audio signals detected by the speaker 152 into a digital audio signal and transmit one or more data packets carrying the digital audio signal to the data processing system 102 via the network 112. The instance of the digital assistant application 110 on the client device 104 can transmit data packets carrying some or the entire input audio signal responsive to detecting an instruction to perform such transmission. The instruction can include, for example, a trigger keyword or other keyword or approval to transmit data packets comprising the input audio signal to the data processing system 102.

The instance of the digital assistant application 110 on the client device 104 can perform pre-filtering or pre-processing on the input audio signal to remove certain frequencies of audio. The pre-filtering can include filters such as a low-pass filter, high-pass filter, or a bandpass filter. The filters can be applied in the frequency domain. The filters can be applied using digital signal processing techniques. The filter can be configured to keep frequencies that correspond to a human voice or human speech, while eliminating frequencies that fall outside the typical frequencies of human speech. For example, a bandpass filter can be configured to remove frequencies below a first threshold (e.g., 70 Hz, 75 Hz, 80 Hz, 85 Hz, 90 Hz, 95 Hz, 100 Hz, or 105 Hz) and above a second threshold (e.g., 200 Hz, 205 Hz, 210 Hz, 225 Hz, 235 Hz, 245 Hz, 255 Hz, or 3 kHz). Applying a bandpass filter can reduce computing resource utilization in downstream processing. The instance of the digital assistant application 110 on the client device 104 can apply the bandpass filter prior to transmitting the input audio signal to the data processing system 102, thereby reducing network bandwidth utilization. Based on the computing resources available to the client device 104 and the available network bandwidth, it may be more efficient in some instances to provide the input audio signal to the data processing system 102 to allow the data processing system 102 to perform the filtering. The instance of the digital assistant application 110 on the client device 104 can apply additional pre-processing or pre-filtering techniques such as noise reduction techniques to reduce ambient noise levels that can interfere with the natural language processor. Noise reduction techniques can improve accuracy and speed of the natural language processor, thereby improving the performance of the data processing system 102 and manage rendering of a graphical user interface provided via the display.

The NLP component 116 of the instance of the digital assistant application 110 running on the data processing system 102 can receive the audio data packet including the input audio signal detected by the microphone 154 of the client device 104. The data packets can provide a digital file. The NLP component 116 can receive or obtain the digital file or data packets comprising the audio signal and parse the audio signal. In providing the input audio signal to the data processing system 102, the NLP component 116 on the client device 104 can generate at least one audio data packet (sometimes referred herein in general as data packet). The audio data packet can include the input audio signal acquired by the microphone 154 of the client device 104. The audio data packet can include data related to the client device 104, the digital assistant application 110 running on the client device, or the transmission of the input audio signal, such as one or more identifiers 136. The identifier 136 can include, for example: a device identifier referencing the client device 104, an account identifier associated with a user of digital assistant application 110 (e.g., as part of authentication credentials), or a session or cookie identifier assigned to current use of the digital assistant application 110, among others. The data in the audio data packet can also include metadata, such as a device attribute associated with the client device 104, an application attribute associated with the digital assistant application 110, and a trait characteristic associated with an account used to log into the digital assistant application 110, among others. Upon generation, the NLP component 116 on the client device 104 can transmit the audio data packet to the data processing system 102. Subsequently, the instance of the digital assistant application 110 running on the data processing system 102 can receive the audio data packet and can process the audio data packet including the input audio signal and any additional data.

To parse the input audio signal, the NLP component 116 can be configured with techniques for understanding natural language and enabling the data processing system 102 to derive meaning from human or natural language input. Using various natural language processing techniques, the NLP component 116 can provide for interactions between a human (e.g., the user of the client device 104) and a computer (e.g., the client device 104 running on the digital assistant application 110). The NLP component 116 can include or be configured with techniques based on machine learning, such as statistical machine learning. The NLP component 116 can utilize decision trees, statistical models, or probabilistic models to parse the input audio signal. The NLP component 116 can perform, for example, functions such as named entity recognition (e.g., given a stream of text, determine which items in the text map to names, such as people or places, and what the type of each such name is, such as person, location (e.g., "home"), or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), or semantic processing (e.g., processing that can occur after identifying a word and encoding its meaning in order to relate the identified word to other words with similar meanings).

The NLP component 116 can convert the input audio signal into recognized string by comparing the input signal against a stored, representative set of audio waveforms (e.g., in the data repository 124) and choosing the closest matches. The set of audio waveforms can be stored in data repository 124 or other database accessible to the data processing system 102. The representative waveforms are generated across a large set of users, and then may be augmented with speech samples from the user. After the audio signal is converted into recognized text, the NLP component 116 matches the text to words that are associated, for example via training across users or through manual specification, with actions that the data processing system 102 can serve. The NLP component 116 can determine that the input audio signal acquired from the microphone 154 does not contain any recognizable strings. The NLP component 116 can determine that the input audio signal contains silence (e.g., with a maximum amplitude of less than 0 dB) in determining that the input audio signal does not contain any recognizable strings. Additionally, the NLP component 116 can determine a signal-to-noise (SNR) of the input audio signal. The NLP component 116 can compare the SNR of the input audio signal to a threshold SNR (e.g., −20 dB). Responsive to the determination the SNR of the input audio signal is greater than the threshold SNR, the NLP component 116 can determine that the input audio signal does not contain any recognizable strings.

The NLP component 116 can receive and process image or video input signals, in addition to, or instead of, input audio signals. The NLP component 116 can convert image or video input to text or digital files. The NLP component 116 can process, analyze, or interpret image or video input to perform actions, generate requests, or select or identify data structures. The data processing system 102 can process the image or video input signals using, for example, image interpretation techniques, computer vision, a machine learning engine, or other techniques to recognize or interpret the image or video to convert the image or video to a digital file. The one or more image interpretation techniques, computer vision techniques, or machine learning techniques can be collectively referred to as imaging techniques. The data processing system 102 (e.g., the NLP component 116) can be configured with the imaging techniques, in addition to, or instead of, audio processing techniques.

From the input audio packet, the NLP component 116 can obtain or identify the input audio signal acquired by the microphone 154 of the client device 104. Upon obtaining, the NLP component 116 partition or divide the input audio signal into one or more audio segments of a time duration (e.g., 15 seconds to 2 minutes) to process or parse each segment. By parsing, the NLP component 116 can identify one or more words from the input audio signal. Based on the identified words, the NLP component 116 can determine whether the input audio signal corresponds to a request for audio content from a particular content publisher 106. The determination can be based on whether the identified match a formatting for the request for audio content. The formatting can be indicated or specified by the regular expressions 126, the parameters 128, the policies 130, and the templates 134 maintained on the data repository 124. The formatting for the request for audio content can be comprised of: a trigger word indicating an intent to retrieve, a type of audio content to be retrieved, and an entity from which the audio content is to be retrieved. For example, the words recognized by the NLP component 116 from the input audio signal can include "Download a podcast from the News Channel XYZ." In this example, the trigger keyword can be "Download," the object can be "a podcast," and the originating entity can be "News Channel XYZ."

With the identification of the words from the input audio signal, the NLP component 116 can determine whether the words correspond or match the formatting for the request for audio content. The determination can be performed using one or more natural language processing techniques. For example, question-answering can be employed to determine the trigger keyword and entity recognition can be used to identify the type of audio content and the originating entity. In response to determining that the words from the input audio request does not match the formatting, the NLP component 116 can determine that the input audio signal does not correspond to the request for audio content. Furthermore, the NLP component 116 can perform additional actions to carry out the other type of request indicated in the words of the input audio signal. Conversely, in response to determining that words match the formatting, the NLP component 116 can determine that the input audio corresponds to the request for audio content. Furthermore, the digital assistant application 110 and the data processing system 102 can perform additional actions to fufill the request in retrieving the audio content from the content publisher 106.

The record indexer component 138 executing on the data processing system 102 can maintain a set of audio recordings 146 on the data repository 144. In maintaining the data repository 144, the record indexer component 138 can receive the audio recording 146 from one of the content publishers 106. Upon receipt, the record indexer component 138 can store the audio recording 146 onto the data repository 144. The record indexer component 138 can also identify the content publisher 106 from which the audio recording 146 is received, associate the audio recording 146 with the content publisher 106, and store the association between the audio recording 146 and the content publisher 106. Each audio recording 146 can be provided or received from one of the content publishers 106 and can be provided via downloading to the digital assistant application 110 on the client device 104. The audio recording 146 can include one or more audio files in any type of format, such as WAV, MPEG, MP3, RIFF, AAC, OGG, and WMA, among others. The audio recording 146 can include the primary audio content created by the associated content publisher 106. In addition to the primary audio content, the audio recording 146 can include at least one content spot 148. The content spot 148 can define a portion of the primary audio content during which supplemental audio content is to be presented. The content spot 148 can be specified or provided by the content publisher 106 using a corresponding content spot marker. The content spot marker can define a time or a time window during which the supplemental content is to be played during the presentation of the primary audio content in the audio recording 146.

In addition, the record indexer component 138 maintain supplemental audio content items 150 (referred hereinafter generally as audio content item 150) on the data repository 144. In maintaining the data repository 144, the record indexer component 138 can receive the audio content item 150 from the content provider 108. Upon receipt, the record indexer component 138 can store the audio recording 146 onto the data repository 144. The record indexer component 138 can also identify the content provider 108 from which the audio content item 150 is received, associate the audio content item 150 with the content provider 108, and store the association between the audio content item 150 and the content provider 108. Each audio content item 150 can be provided or received from one of the content provider 108 and can be provided as part of the audio recording 146 via downloading onto the digital assistant application 110 on the client device 104. Each audio content item 150 can include one or more audio files in any type of format, such as WAV, MPEG, MP3, RIFF, AAC, OGG, and WMA, among others. The audio content item 150 can include the supplemental audio content created by the associated content provider 108. The supplemental audio content of the audio content item 150 can be inserted into the content spot 148 of one of the audio recordings 146. Once inserted, the supplemental audio content of the audio content item 150 presented before, during, or after the primary audio content as specified by the content spot marker for the content spot 148.

In response to determining that the input audio signal corresponds to the request for audio content, the NLP component 116 can identify the audio recording 146 from the data repository 144 to provide to the digital assistant application 110 on the client device 104. Based on the words parsed from the input audio signal, the NLP component 116 can identify the content publisher 106 whose audio content is associated with the request. For example, the NLP component 116 can use entity recognition to identify the content publisher entity associated with the content publisher 106.

With the identification of the content publisher 106 associated with the request, the NLP component 116 can access the data repository 144 to identify a subset of audio recordings 146 belonging to the content publisher 106. The NLP component 116 can invoke the record indexer component 138 to search for and retrieve at least one of the audio recordings 146 from the data repository 144 using the identified content publisher 106. For example, the record indexer component 138 can search for the most recent audio recording 146 from the content publisher 106 that is stored and maintained on the data repository 144. From the subset, the NLP component 116 can identify one audio recording 146 to provide based on the words parsed from the input audio signal.

The content placement component 140 executing on the data processing system 102 can select or identify at least one of the audio content items 150 to insert into each content spot 148 of the audio recording 146 associated with the request. With the determination that the input audio signal corresponds to the request for content, the content placement component 140 can identify at least one content selection parameter. The content selection parameter can be used to select one of the audio content items 150 to include into the content spot 148 of the audio recording 146. The content selection parameter can include, for example: the identifier 136 (e.g., the device identifier, the account identifier, or the session or cookie identifier); at least one device attribute associated with the client device 104 (e.g., a device type, a device capability, a network address, and a geographic location); at least one application attribute associated with the digital assistant application 110 on the client device 104 (e.g., an application name, a version, or presentation capabilities); and at least one trait characteristic associated with the account identifier used to log into the digital assistant application 110 (e.g., account profile, interest identifiers, or a user segment), among others.

To identify the content selection parameter, the content placement component 140 can parse the audio data packet provided by the digital assistant application 110 on the client device 104 to identify the data included therein. By parsing, the content placement component 140 can extract or identify the identifier 136 included in the audio data packet. Once identified, the content placement component 140 can use the identifier 136 from the audio data packet as one of the content selection parameters. In lieu of or in addition to parsing, the content placement component 140 can retrieve the identifier 136 from the digital assistant application 110 on the client device 104 via an application programming interface (API). For example; the audio data packet can lack the identifier 136, and the digital assistant application 110 may have been authenticated for operations using the identifier 136. In this example, the content placement component 140 can invoke a function call in accordance with the specifications of the API used by the digital assistant application 110 to fetch the identifier 136. Furthermore, the content placement component 140 can parse the audio data packet to identify the metadata included therein, such as the device attribute, the application attribute, and the trait characteristic, among others. With the identification, the content placement component 140 can use the device attribute, the application attribute, or the trait characteristic identified from the audio data packet as the content selection parameters.

In addition, the content placement component 140 can determine a content spot parameter for each content spot 148 included in the audio recording 146 associated with the request of the input audio signal. The content spot parameter can be used to value the content spot 148, and can be proportional to the measured or estimated number of views of the audio recording 146 or supplemental audio content inserted into the content spot 148, or a combination thereof. The number of listenings of the audio recording 146 itself and the number of listenings of the supplemental audio content insert into the content spot 148 of the audio recording 146 can be instrumented from previous servings of the audio recording 146 across a multitude of client devices 104. For example, the number of listenings of the audio recording 145 can be measured from the instrumenting the playback of the audio recording 145 via multiple instances of the digital assistant application 110 across different client devices 104. The number of listenings of supplemental audio content inserted into one content spot 148 of the audio recording 146 can be measured from detecting a number of predefined interaction events detected across multiple client devices 104 that have been provided with the audio recording 146. The predefined interaction event can include, for example: a subsequent voice query detected via the microphone 154 of the client device 104 including words related to the supplemental audio content or a set of interactions on an information resource associated with the content provider 108 associated with the supplemental audio content. From the measured number, the estimated number of listenings of the audio recording 146 and of the supplemental audio content insert into the content spot 148 can be calculated (e.g., via reconstruction, trend estimation, or extrapolation techniques). Both the measured numbers and the estimated numbers can be determined and maintained by a counter of the data processing system 102.

In determining the numbers, the content placement component 140 can establish at least one prediction model for estimating the number of listenings of the audio recordings 146 and the number of listenings of the supplemental audio content inserted into the content spot 148. The prediction model can be generated in accordance with any number of machine learning algorithms or models, such as a regression model (e.g., linear or logistic), a support vector machine, an artificial neural network (ANN), a random forest classifier, a Bayesian statistical model, or a k-nearest neighbor algorithm, among others. The prediction model can be established using a training dataset maintained on the data repository 124 or 144. The training dataset can include previous or sample measurements on the number of listenings of other audio recordings 146 and number of listenings of supplemental audio content inserted into the audio recordings 146 at various content spots 148. In addition, the training dataset can include one or more characteristics of the audio recordings 146 and the content spots 148 themselves, for example: a length of each audio recording 146, a length of the content spot 148 in the audio recording 146, a time at which the content spot 148 is defined within the audio recording 148, a topical category of the audio recording 146, and a topical category of the supplemental audio content inserted into the content spot 148, among others, The training dataset can also include data regarding the listeners of the audio recordings 146, such as: the device attribute, the application attribute, or the trait characteristic, among others. Using the training dataset, the content placement component 140 can train the prediction model in accordance with the type of machine learning algorithm or model (e.g., until convergence). Upon training, the prediction model can be used to determine a predicted (or estimated) number of listenings of the audio recording 146 and the number of listenings of the supplemental audio content to be inserted into any of the content spots 148 within the audio recording 146.

To determine the content spot parameter for the content spot 148, the content placement component 140 can calculate, determine, or identify the number of listenings of the audio recording 146 across the multitude of client devices 104. The content placement component 140 can identify the measured number of listenings of the audio recording 146 maintained by the counter. The content placement component 140 can identify the estimated number of listenings of the audio recording 146 (e.g., calculated using extrapolation). The content placement component 140 can also apply the audio recording 146 to determine a predicted number of listenings of the audio recording 146. In applying, the content placement component 140 can identify various characteristics of the audio recording 146 (e.g., length and topical category). Upon applying, the content placement component 140 can determine or identify the predicted number of listenings outputted by the prediction model.

Furthermore, for each content spot 148 in the audio recording 146, the content placement component 140 can calculate, determine, or identify the number of listenings of the supplemental audio content inserted into the content spot 148 across the multitude of client devices 104. The supplemental audio content can correspond to one or more of the audio content items 150 maintained on the data repository 144. The content placement component 140 can identify the measured number of listenings of the supplemental audio content inserted into the content spot 148 maintained by the counter. The content placement component 140 can identify the estimated number of listenings of the supplemental audio content inserted into the content spot 148 (e.g., calculated using extrapolation). The content placement component 140 can also apply the audio recording 146 to determine a predicted number of listenings of the supplemental audio content inserted into the content spot 148. In applying, the content placement component 140 can identify various characteristics of the audio recording 146 (e.g., length and topical category) and the content spot 148 (e.g., time within the audio recording 146). Upon applying, the content placement component 140 can identify the predicted number of listenings outputted by the prediction model.

Based on the measured, estimated, or predicted number of listenings, the content placement component 140 can calculate or determine the content spot parameter for the content spot 148 in the audio recording 146. The content placement component 140 can determine one content spot parameter using the number of listenings for the audio recording 146. The content placement component 140 can also determine another separate content spot parameter using the number of listenings for the supplemental audio content in the content spot 148 of the audio recording 146. The content placement component 140 can also determine a single content spot parameter based on a combination of the number of listenings for the audio recording 146 and the number of listenings for the content spot 148 in the audio recording 146. The combination can include, for example, a summation, an average, a weighted average, or a function, among others, or any combination thereof.

In selecting the supplemental audio content to insert into the content spot 148, the content placement component 140 can run or perform a content placement process to select the audio content item 150 from a set of candidate audio content items 150. In running the process, the content placement component 150 can request, retrieve, or identify a content submission parameter from each content provider 108. The content submission parameter can represent or indicate the valuing of the content spot 148 in the audio recording 146 by the corresponding content provider 108. The content submission parameter can be associated with the audio content item 150 provided by the corresponding content provider 108. The higher the value of the content submission parameter, the more likely the audio content item 150 of the content provider 108 may be selected. To retrieve the content submission parameters, the content placement component 150 can send a request for parameters to each content provider 108. The request can include the content selection parameter and the content spot parameter. Upon receipt, each content provider 108 can determine or generate the content submission parameter based on the content selection parameter and the content spot parameter. Once generated, the content provider 108 can respond back with the content submission parameter to send to the data processing system 102.

Using the one or more parameters, the content placement component 140 can select at least one of the audio content items 150 to insert into the content spot 148 of the identified audio recording 146. The content placement component 140 can select the audio content item 150 from the set of candidate audio content items 150 maintained on the data repository 144 based on the content selection parameter. For example, the content placement component 140 can find the audio content item 150 with specifications (e.g., device attribute, application attribute, and trait attributes) matching the content selection parameter. The content placement component 140 can also select the audio content item 150 based on the content spot parameter (in combination with the content selection parameter). For example, the content placement component 140 can identify a subset of audio content items 150 with a categorical topic matching an interest indicated by the trait attribute and with the same length as the content spot 148. In this example, from the subset, the content placement component 140 can select one audio content item 150 with the highest predicted number of listenings for supplemental audio content for insertion into the audio recording 146 at the content spot 148.

In selecting the content item 150, the content placement component 140 can also use the content submission parameter, and can continue with the content placement process with the receipt of the content submission parameters. The content placement component 140 can rank the content submission parameters received from the various content providers 108. From the ranking, the content placement component 140 can identify the content provider 108 with the highest content submission parameter. With the identification, the content placement component 140 can identify or select the audio content item 150 from the content provider 108 with the highest content submission parameter in the ranking. Any combination of the content selection parameter, the content spot parameter, or the content submission parameter can be used to identify or select the audio content item 150 to insert into the content spot 148 of the audio recording 146. The content placement component 140 can repeat the process of selecting one audio content item 150 for each of the content spots 148 defined for the audio recording 146.

The direct action handler component 120 of the digital assistant application 110 can insert the audio content item 150 selected by the content placement component 115 into the content spot 148 of the audio recording 146. With the selection of the audio content item 150 form the data repository 144, the direct action handler component 120 can access the data repository 144 to identify the audio recording 146 identified by the NLP component 116. For example, the direct action handler component 120 can retrieve the one or more audio files corresponding to the audio recording 146 generated by the content publisher 106 and identified by the NLP component 116. Upon identification, the direct action handler component 120 can identify the content spot 148 in the audio recording 146 for which the audio content item 150 is selected. The direct action handler component 120 can add, embed, or insert the audio content item 150 into the content spot 148 at the time defined by the corresponding content spot marker. For example, the direct action handler component 120 can delete or null the audio content from the audio recording 146 during the time window defined by the content spot marker for the content spot 148. Upon removal, the direct action handler component 120 can overlay the selected audio content item 150 into the time window of the content spot 148 within the audio recording 146. In inserting the audio content item 150, the direct action handler component 120 can perform one or more signal processing algorithms to convert the supplemental audio content for compatibility with the remainder of the audio recording 146. The signal processing algorithms can include, for example, various audio mixing techniques, such as equalization, compression, and balancing, among others. The direct action handler component 120 can insert all the audio content items 150 selected for the content spots 148 of the audio recording 146. With the insertion of the audio content item 150, the direct action handler component 120 can cache or store the audio recording 146 (e.g., as one or more edited audio files) for provision to the client device 104.

The direct action handler component 120 can generate at least one action data structure to carry out the request indicated in the input audio signal detected by the microphone 154 on the client device 104. The action data structure can be generated in accordance with the HyperText Transfer Protocol (HTTP), among others. For example, the action data structure can be included in a body (or payload) of an HTTP response, along with other data, to complete the request specified in the input audio signal. The direct action handler component 120 can invoke the response selector component 122 format or generate the direct action structure in accordance with the data stored in the data repository 124, such as the regular expression 126, the parameters 128, the policies 130, the response data 132, and the templates 134, among others. For example, the response selector component 122 can retrieve the template 134 from the data repository 124 to determine which fields to include in the action data structure. The response selector component 122 can retrieve content from the data repository 124 to obtain information for the fields of the data structure for a response to the request for the audio content. The response selector component 122 (or the direct action handler component 120) can include one or more words in a message to be included in the action data structure as a response to the request for audio content. For example, the response message can include the words "Found podcast. Downloading from Talk Show PQR."

In generating the action data structure, the direct action handler component 120 can include the audio recording 146 with one or more audio content items 150 inserted into the content spots 148. The direct action handler component 120 can insert the one or more audio files corresponding to the audio recording 146 with the inserted audio content items 150 into the action data structure. The direct action handler component 120 can include an address (e.g., a URL address or a network address) referencing the audio recording 146 with the audio content items 150 into the action data structure. The address can be used by the instance of the digital assistant application 110 on the client device 104 to retrieve or download the audio recording 146 with the audio content items 150 inserted from the data repository 144. The direct action handler component 120 can include the audio recording 146 as part of the body of the HTTP response that includes the action data structure. Upon insertion, the direct action handler component 120 can provide, send, or transmit the action data structure to the instance of the digital assistant application 110 on the client device 104. The transmission of the action data structure can involve or correspond to uploading of the audio recording 146 onto the client device 104, without streaming the audio recording 146 to the client device 104. For example, rather than providing chunks of the audio recording 146 via streaming, the direct action handler component 120 can transmit the files corresponding to the audio recording 146 for downloading onto the client device 104.

With the transmission, the instance of the digital assistant application 110 on the client device 104 can receive the action data structure including the audio recording 146 with the inserted audio content items 150. The receipt of the action data structure can involve or correspond to retrieval or downloading of the audio recording 146 itself by the digital assistant application 110, rather than streaming of the audio content included in the audio recording 146. The digital assistant application 110 on the client device 104 can parse the action data structure to extract, retrieve, or identify the audio recording 146. For example, when the audio file is included, the digital assistant application 110 can pull the one or more audio files corresponding to the audio recording 146 from the body of the HTTP response. When the address to the audio recording 146 with the inserted audio content items 150 are included, the digital assistant application 110 can retrieve and download the audio recording 146 using the address onto the client device 104 (e.g., on the hard drive or memory). Subsequent to retrieval, the digital assistant application 110 can present the audio recording 146 with the inserted audio content items 150 at the content spots 148 via the speaker 152 of the client device 104. For example, the digital assistant application 110 on the client device 104 can include a media player component to handle playback the downloaded audio content of the audio recording 146 via the speaker 152.

The audio signal generator component 118 of the digital assistant application 110 (on the data processing system 102 or the client device 104) can parse the action data structure to identify words for the response. The audio signal generator component 118 can generate an output audio file based on the one or more words of response phrase in the response to the request indicated in the input audio signal. The audio signal generator component 118 can play (e.g., via the speaker 152) the output audio file of the one or more words of the response phrase. For example, the audio signal generator component 118 can generate an output audio file including the words "Found podcast. Downloading from Talk Show PQR." The digital assistant application 110 on the client device 104 can also display the one or more words of the response phrase.

The conversion detection component 142 executing on the data processing system 102 can monitor for one or more interaction events occurring on the client device 104 subsequent to provision of the audio recording 146 with the inserted audio content items 150. The interaction events can include another input audio signal, a click event, a screen touch event, or a playback initiation event, a playback pause event, or among others detected via the client device 104.

The conversion detection component 142 can use any number of techniques to monitor for interaction events. For example, the conversion detection component 142 can use the identifier 136 (e.g., in the form of the session identifier) to access the interaction events received via a web application (e.g., a web browser). The conversion detection component 142 can use the identifier 136 (e.g., in the form of the device identifier or account identifier) to access the interaction events detected via an application programming interface (API) for the digital assistant application 110 on the client device 104. The API can define function calls for retrieval of at least pre-defined interaction events detected on the digital assistant application 110 on the client device 104. For example, the digital assistant application 110 can send an indication to the conversion detection component 142 via the API upon detection of a playback initiation and subsequent playback completion events. The conversion detection component 142 can access a location within the playback of the audio recording 146 by the digital assistant application 110 via the API. The location can indicate a point of time within the audio recording 146 is playing via the client device 104.

By monitoring, the conversion detection component 142 can maintain and update a counter for the number of listenings of the audio recording 146 across the multitude of client device 104. The counter can indicate the measured number of listenings to the audio recording 146, and may be used by the content placement component 140 in determining the content spot parameter. To maintain the counter, the conversion detection component 142 can monitor the location within the playback of the audio recording 146 (e.g., via the API for the digital assistant application 110). The conversion detection component 142 can commence monitoring of the playback in response to detecting a playback initiation event from the digital assistant application 110 on the client device 104. The conversion detection component 142 can determine whether the location matches a predefined duration of the audio recording 146. The predefined duration can correspond to an entire length in time of the audio recording 146 or a percentage of the entire length (e.g., 75-95%) of the audio recording 146 as specified by the content publisher 106.

The conversion detection component 142 can compare the monitored location with the predefined duration. By comparing, the conversion detection component 142 can determine whether the playback of the audio recording 146 has completed on the digital assistant application 110 on the client device 104. In response to determining that the location matches the predefined duration, the conversion detection component 142 can determine that the playback of the audio recording 146 is completed. Furthermore, the conversion detection component 142 can increment the counter for the number of listenings of the audio recording 146. The conversion detection component 142 can also use the detection of the playback complete event to increment the counter, independent of the monitored location. Conversely, in response to the determining that the location does not match the predefined duration, the conversion detection component 142 can continue to monitor the location of the playback.

In addition, the conversion detection component 142 can maintain a counter for the number of listenings of the supplemental audio content inserted into the content spot 148 of the audio recording 146 across the multitude of client devices. The counter can indicate the measured number of listenings to the supplemental audio content (e.g., the selected audio content item 150 or another audio content item 150) inserted into the content spot 148 of the audio recording 146. The counter may be used by the content placement component 140 in determining the content spot parameter. To maintain the counter for the number of listenings of the audio content item 150, the conversion detection component 142 can compare the one or more detected interaction events with a set of predefined interaction events. The set of interaction events can be predefined for the audio content item 150 inserted into the content spot 148 of the audio recording 148. The set of interaction events can specified by the content provider 108 for the audio content item 150 as corresponding to a conversion, and can include one or more events expected for the conversion. For example, the set of interaction events for the audio content item 150 can include acquisition of an input audio signal via the microphone 154 of the client device 104 including a name of the content provider 108.

From the comparison, the conversion detection component 142 can determine whether the detected interaction events match the predefined interaction events for the audio content item 150. In response to determining a match between the detected and predefined interaction events, the conversion detection component 142 can determine that the supplemental audio content inserted into the content spot 148 of the audio recording 146 is listened to. Furthermore, the conversion detection component 142 can increment the counter for the number of listenings of the supplemental audio content inserted into the content spot 148 of the audio recording 146. The conversion detection component 142 can also maintain and update a counter for the number of listenings of the audio content item 150 itself. On the other hand, in response to determining a lack of the match between the detected and predefined interaction events, the conversion detection component 142 can determine that the supplemental audio content inserted into the content spot 148 did not result in a conversion. In addition, the conversion detection component 142 can sustain a value of the counter for the number of listenings of the supplemental audio content inserted into the content spot 148 of the audio recording 146.

Based on the measured numbers, the conversion detection component 142 can calculate or determine an expected number of listenings of the audio recording 146 and an expected number of listenings of the supplemental audio content inserted into each content spot 148 of the audio recording 146. The conversion detection component 142 can access the counters to identify the measured number of listenings of the audio recording 146 and the measured number of listenings of the supplemental audio content inserted into the content spot 148 of the audio recording 146. With the identification, the conversion detection component 142 can apply any number of techniques, such as regression, reconstruction, trend estimation, or extrapolation, to determine the expected number of listenings. For example, the conversion detection component 142 can identify the number of measured listenings of the audio recording 146 (or the supplemental audio content at one of the content spots 148) over time. The conversion detection component 142 can construct a polynomial function to characterize the number of measured listenings. In accordance with the constructed function, the conversion detection component 142 can determine the expected number of listenings of the audio recording 146 at a future time point.

In this manner, the audio content items 150 presented with the audio recording 146 can have higher relevance to the user of the digital assistant application 110 of the client device 104 that made the initial request. With the increased relevance, the likelihood of subsequent interaction in connection with the audio content item 150 can increase. In addition, the chances that subsequent voice commands to the digital assistant application 110 are incongruous with prior voice commands or the audio recording 146 can be lowered. The inclusion of such audio content items 150 into the audio recording 146 can thus improve the human-interaction interaction between the user and the digital assistant application 110 on the client device 104, while conversing computing resources and saving network bandwidth.

Figure 2:
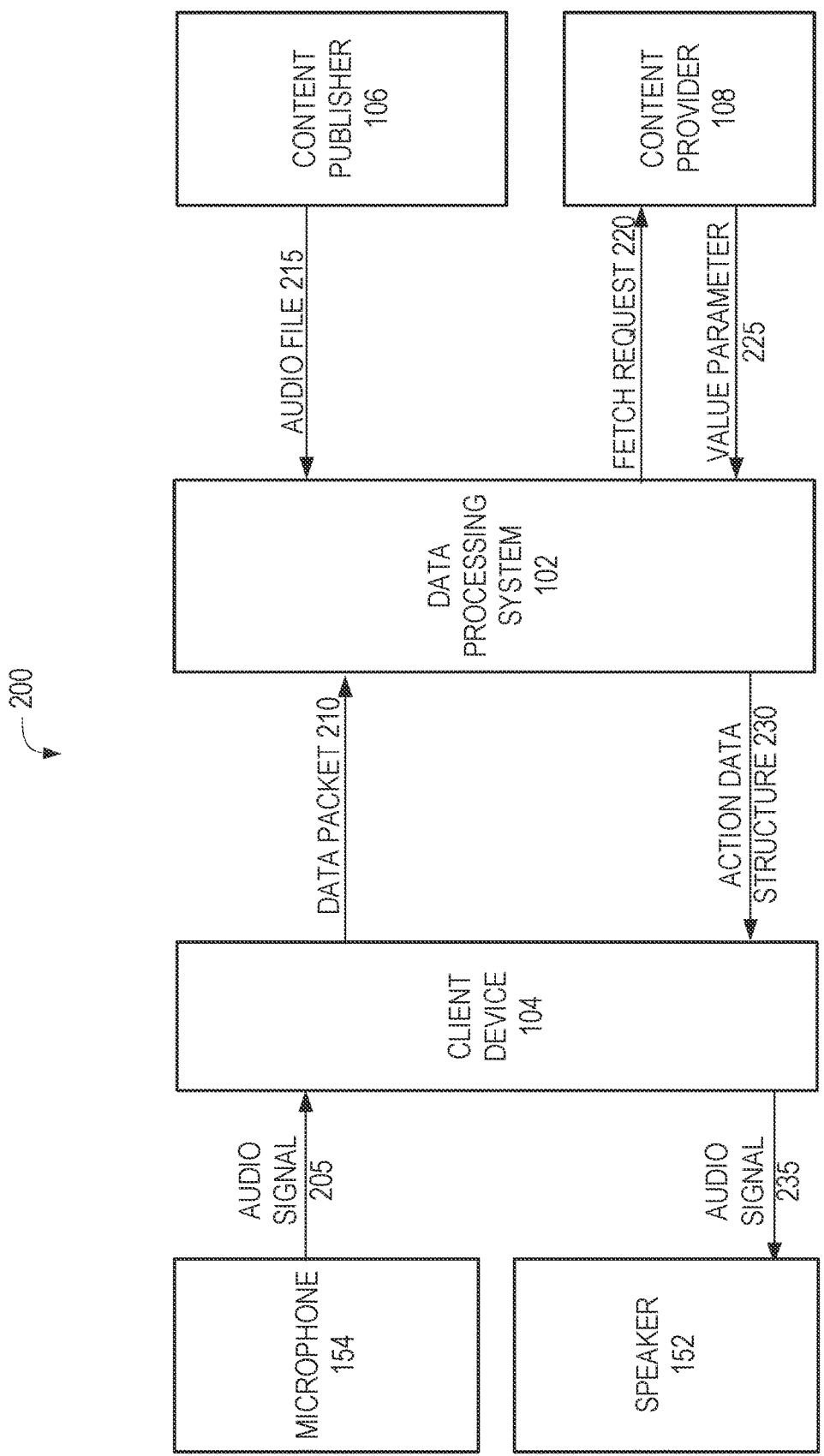
FIG. 2 illustrates a sequence diagram of an example data flow to insert supplemental audio content into primary audio content via digital assistant applications in the system illustrated in FIG. 1, in accordance with an example of the present disclosure.

FIG. 2, among others, depicts a sequence diagram of an example data flow 200 to insert supplemental audio content into primary audio content in the system illustrated in FIG. 1. The data flow 200 can be implemented or performed by the system 100 described above in conjunction with FIG. 1 or system 500 detailed below in conjunction with FIG. 5. The data flow 200 can include communications in the form of packets (e.g., HTTP messages) among the data processing system 102, the client device 104, the content publisher 106, the content provider 108, the speaker 152, and the microphone 154, among others.

An instance of the digital assistant application 110 on the client device 104 can detect audio signal 205 via the microphone 156. The digital assistant application 110 can perform initial processing on the audio signal 205 to generate a data packet 210 (sometimes referred herein as an audio data packet). The data packet 210 can include the input audio signal 205 itself or one or more string identified from the audio signal 205 using natural language processing techniques. The client device 104 can send the data packet 210 to a remote instance of the digital assistant application 110 on the data processing system 102.

Meanwhile, the data processing system 102 can receive an audio file 215 from the content publisher 106. The audio file 215 can be an instance of the audio recording 146, and can include primary audio content generated by the content publisher 106. The audio file 215 can be received with a content spot marker defining time windows within the primary audio content of the audio file 215 in which to insert the supplemental audio content. Upon receipt, the data processing system 102 can store and maintain the audio file 215 onto the data repository 144.

The instance of the digital assistant application 110 on the data processing system 102 can receive the data packet 210 from the client device 104. Upon receipt, the digital assistant application 110 can parse the input audio signal included in the data packet 210 to identify one or more words. With the identification, the digital assistant application 110 can determine that the words correspond to a request for audio content form one of the content publishers 106. In response to the determination, the digital assistant application 110 can identify the audio file 210 from the specified content publisher 106. In addition, the digital assistant application 110 can invoke a content placement process (e.g., via the content placement component 140).

In performing the processing, the data processing system 102 can determine a content selection parameter for the client device 104 making the request and can determine a content spot parameter for the content spot in the audio file 215. The data processing system 102 can also send a fetch request 220 to content providers 108 for content placement parameter. Upon receipt, each content provider 108 can generate a value parameter 225 (sometimes referred herein as a content submission parameter). The value parameter 225 can indicate a valuing of the content spot 148 within the audio file 215 by the corresponding content provider 108. Once generated, each content provider 108 can transmit the value parameter 225 to the data processing system 102. Using the various parameters, the data processing system 102 can select one audio content item 150 to include into the content spot 148 of the audio file 215 in accordance with the content placement process.

With the selection of the audio content item 150, the instance of the digital assistant application 110 on the data processing system 102 can insert the audio content item 150 into the content spot 148 of the audio file 215. The digital assistant application 110 can also generate an action data structure 230 to package or include the audio file 215 with the audio content item 150 inserted into the content spot 148. Upon generation, the digital assistant application 110 on the data processing system 102 can transmit the action data structure 230 to the instance of the digital assistant application 110 on the client device 104. The transmission of the audio file 215 can be a download onto the client device 104, rather than a stream. In turn, the digital assistant application 110 on the client device 104 can receive and parse the action data structure 230 to identify the audio file 215 with the inserted audio content item 150. With the identification, the digital assistant application 110 can convert the audio file 215 with the inserted audio content item 250 into an audio signal 235 for playback. The speaker 152 can output the audio signal 235 to present and playback the primary and supplemental audio content included in the audio file 215.

Figure 3:
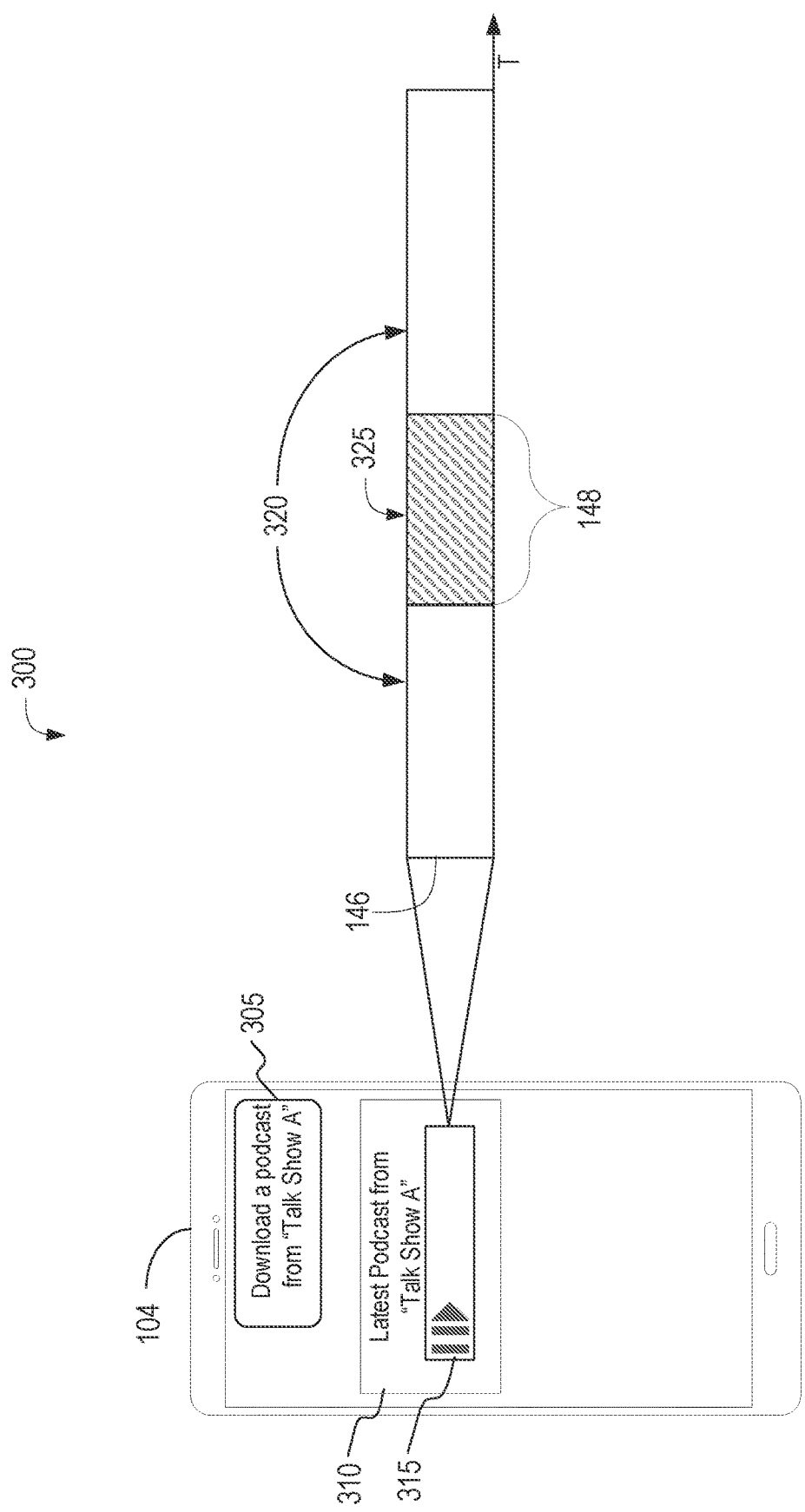
FIG. 3 illustrates an example client computing device presenting the primary audio content inserted with the supplemental audio content, in accordance with an example of the present disclosure.

FIG. 3, among others, depicts an example client device 104 with request and response messages in presenting primary and supplemental audio content under configuration 300. In the configuration 300, the instance of the digital assistant application 110 running on the client device 104 can receive an input audio signal via the microphone 154. The NLP component 116 can use natural language processing techniques to recognize one or more words in the input audio signal. The digital assistant application 110 can display the output of the natural language processing techniques as a textual content item 305. The textual content item 305 can include the words "Download a podcast from Talk Show A" parsed from the input audio signal acquired via the microphone 154. The NLP component 116 can also use the natural language processing techniques to recognize that the words parsed from the input audio signal correspond to a request for audio content. The NLP component 116 can identify the content publisher 106 (e.g., "Talk Show A") associated with the request. The digital assistant application 110 can display the results of the carrying out of the request with a textual content item 310. The textual content item 310 can include the words "Latest Podcast from Talk Show A," and can include a media player interface 315. The media player interface 315 can include, for example as depicted, a pause button, a play button, and a progress bar, among others.

In fulfilling the request as indicated in the input audio signal, the NLP component 116 can identify one of the audio recordings 146 associated with the content publisher 106 from the data repository 144. The audio recording 146 can include primary audio content 320 and at least one content spot marker defining the content spot 148. The content spot 148 can define a time window within to insert supplemental audio content 325. To insert the supplemental audio content 325, the content placement component 140 can determine a content selection parameter for the client device 104 and a content spot parameter for the content spot 148. In addition, the content placement component 140 can gather content submission parameters from various content providers 108 associated with candidate audio content items 150. The content placement component 140 can run a content placement process using the set of parameters to select one of the audio content items 150 to insert into the content spot 148. Once inserted, the data processing system 102 can provide the audio recording 146 with the audio content item 150 for downloading onto the client device 104 and playback via the digital assistant application 110 on the client device 104. Upon receipt of an interaction with the play button on the media player interface 315, the digital assistant application 110 can playback the audio recording 146 with the audio content item 150.

Figure 4:
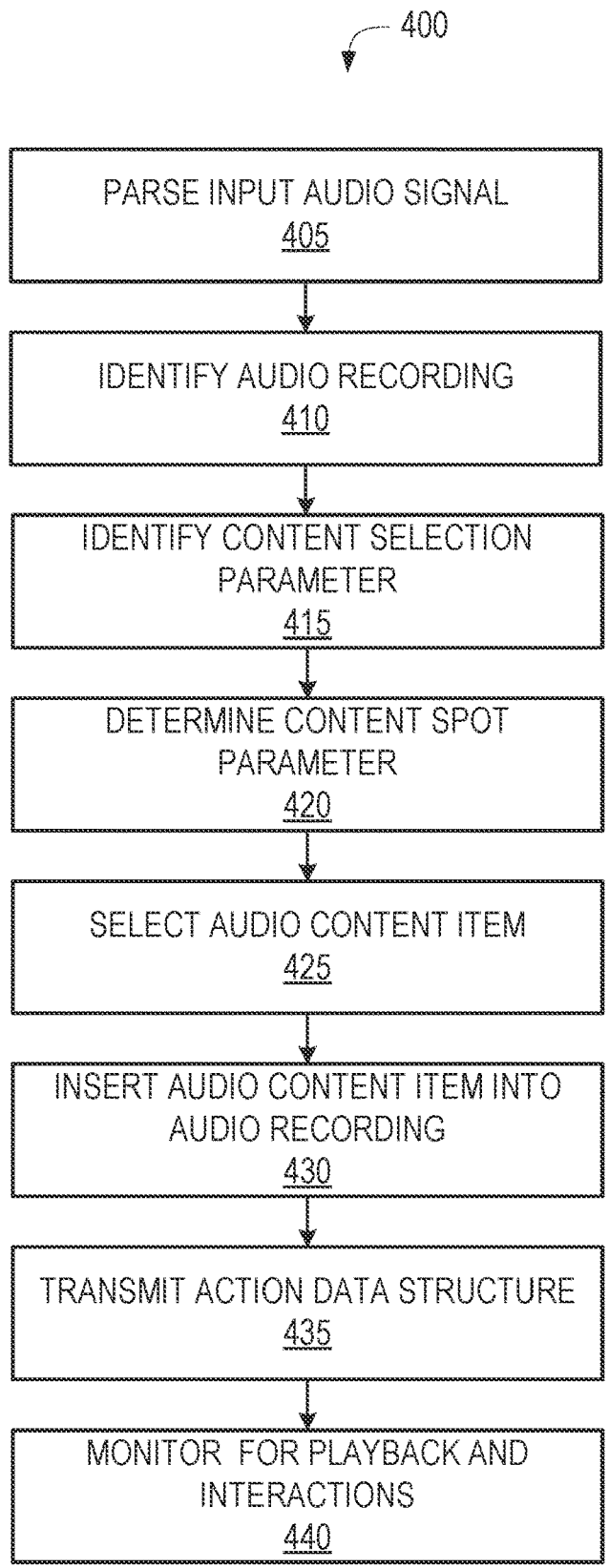
FIG. 4 illustrates a flow diagram of a method to insert supplemental audio content into primary audio content via digital assistant applications using the example system illustrated in FIG. 1, in accordance with an example of the present disclosure.

FIG. 4, among others, depicts a flow diagram of an example method 400 to insert supplemental audio content into primary audio content via digital assistant applications. The method 500 can be implemented or executed by the system 100 described above in conjunction with FIGS. 1-3 or system 500 detailed below in conjunction with FIG. 5. The method 400 can include parsing an input audio signal (405). An instance of a digital assistant application 110 on a client device 104 can receive the input audio signal acquired via a microphone 154. The digital assistant application 110 can perform initial processing and package the input audio signal into an audio data packet to send to the data processing system 102. An instance of the digital assistant application 110 on the data processing system 102 can receive the audio data packet from the client device 104. An NLP component 116 can parse the audio data packet to identify the input audio signal. To process, the NLP component 116 can use natural language processing to identify one or more words in the input audio signal and can determine that the input audio signal corresponds to a request for audio content based on the recognized words.

The method 400 can include identifying an audio recording 146 (410). In response to determining that the input audio signal corresponds to the request for audio content, the NLP component 116 can identify the content provider 108 associated with the request. With the identification, the NLP component 116 can access the data repository 144 to identify the audio recording 146 belonging to the content publisher 106 indicated in the request. The data repository can be maintained by the record indexer component 138, and can include audio recordings 146 from various content publishers 106. The audio recording 146 can include primary audio content and at least one content spot 148 defined by a content spot marker for insertion of supplemental audio content.

The method 400 can include identifying a content selection parameter (415). A content placement component 140 on the data processing system 102 can determine the content spot parameter for the client device 104 in response to determining that the input audio signal corresponds to the request for content. The content placement component 140 can identify an identifier 136 (e.g., a device identifier, an account identifier, or a session or cookie identifier) associated with the digital assistant application 110 on the client device 104 that made the request. The content placement component 140 can also identify data associated with the audio data packet, such as a device attribute, an application attribute, or a trait characteristic, among others. The content placement component 140 can use the identifier 136 and the associated data as the content selection parameter.

The method 400 can include determining a content spot parameter (420). To determine the content spot parameter for one of the content spots 148, the content placement component 140 can identify a number of listenings of the identified audio recording 146. The content placement component 140 can also identify the number of listenings of the supplemental audio content inserted into the content spot 148 of the audio recording 146. Each number of listenings can be measured using a counter, estimated using extrapolation, or predicted using a machine learning model. Once identified, the content placement component 140 can calculate or determine the content spot parameter based on the numbers of listenings.

The method 400 can include selecting an audio content item 150 (425). Using the content selection parameter and the content spot parameter, the content placement component 140 can select one of the audio content items 150 to insert into the content spot 148 of the audio recording 146. The content placement component 140 can also perform a content placement process to select the audio content item 150. In running the process, the content placement component 140 can fetch a content submission parameter from each content provider 108 associated with one of the candidate audio content items 150. In addition to the content selection parameter and the content spot parameter, the content placement component 140 can also use the content submission parameter in selecting the audio content item 150 for insertion.

The method 400 can include inserting the audio content item 150 into the audio recording 146 (430). A direct action handler component 120 of the digital assistant application 110 can insert the selected audio content item 150 into the content spot 148 of the audio recording 146. To insert, the direct action handler component 120 can identify the content spot 148 defined by the content spot marker for the audio recording 146. Once identified, the direct action handler component 120 can overlay or insert the selected audio content item 150 into the content spot 148 of the audio recording 146. The direct action handler component 120 can also perform additional signal processing techniques to facilitate the insertion of the audio content item 150 into the audio recording 146.

The method 400 can include transmitting an action data structure (435). The direct action handler component 120 can generate the action data structure to include the audio recording 146 with the inserted audio content item 150. The generation of the action data structure can be in accordance with HyperText Transfer Protocol (HTTP), with the action data structure included as part of a body of an HTTP response. Once generated, the direct action handler component 120 can send or provide the action data structure to the instance of the digital assistant application 110 on the client device 104. In providing the action data structure, the direct action handler component 120 can provide the audio recording 146 with the inserted audio content item 150 as a download, rather than streaming. Upon receipt, the instance of the digital assistant application 110 on the client device 104 can commence playback of the audio recording 146 with the inserted audio content item 150.

The method 400 can include monitoring for playback and interactions (440). A conversion detection component 142 on the data processing system 102 can monitor for interactions and playback, subsequent to the transmission of the action data structure. The conversion detection component 142 can use any number of techniques to monitor, such as use of a session cookie or accessing the client device 104 via an application programming interface for the digital assistant application 110. Using the detected interactions and playback, the conversion detection component 142 can maintain and update a counter for the number of listenings for the audio recording 146. The conversion detection component 142 can maintain and update a counter for the number of listenings for the supplemental audio content inserted into the content spot 148 of the audio recording 146.

Figure 5:
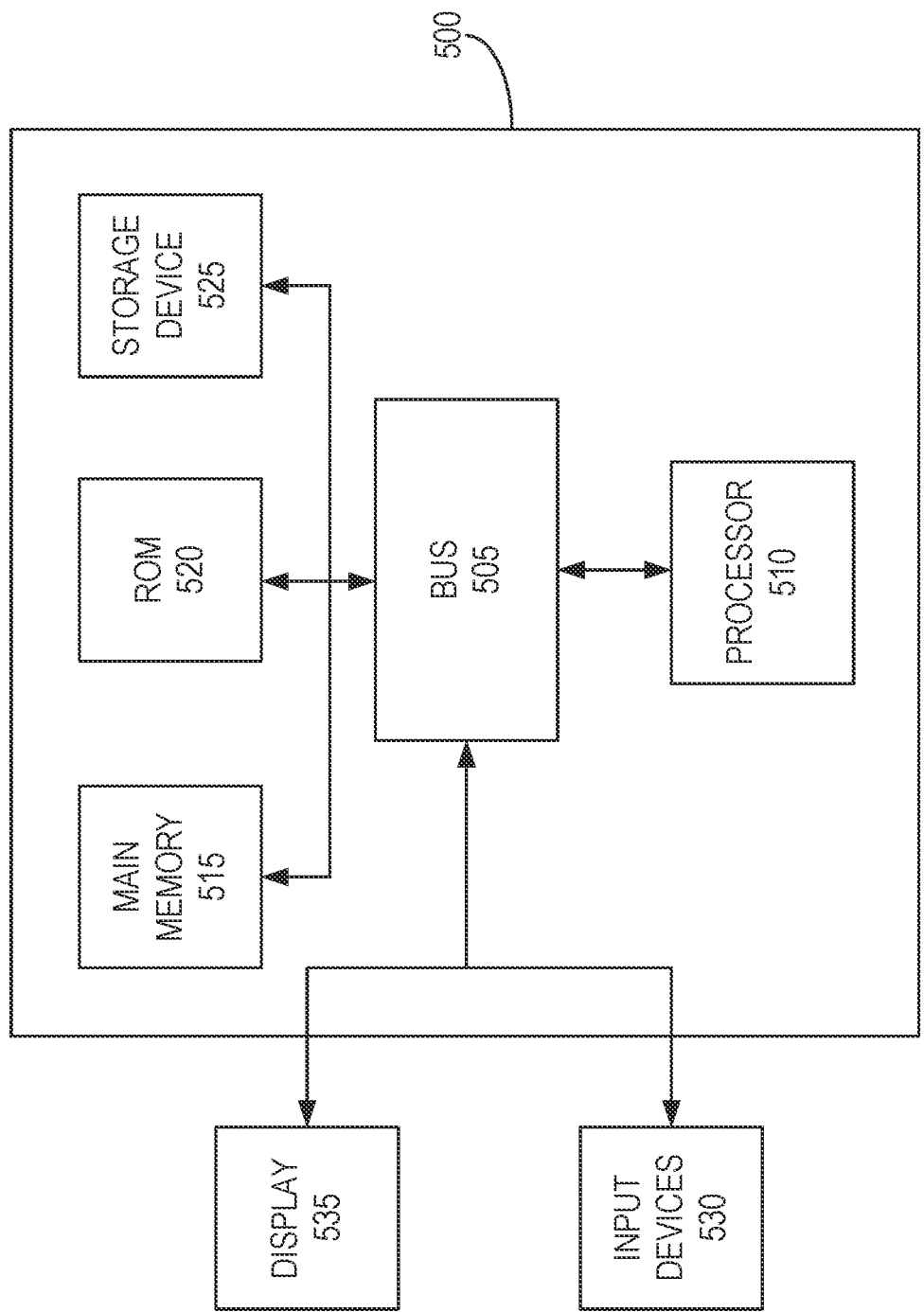
FIG. 5 is a block diagram of an example computer system.

FIG. 5 is a block diagram of an example computer system 500. The computer system or computing device 500 can include or be used to implement the system 100 or its components such as the data processing system 102. The computing system 500 includes a bus 505 or other communication component for communicating information and a processor 510 or processing circuit coupled to the bus 505 for processing information. The computing system 500 can also include one or more processors 510 or processing circuits coupled to the bus for processing information. The computing system 500 also includes main memory 515, such as a random access memory (RAM) or other dynamic storage device, coupled to the bus 505 for storing information and instructions to be executed by the processor 510. The main memory 515 can be or include the data repository 124 or 144. The main memory 515 can also be used for storing position information, temporary variables, or other intermediate information during execution of instructions by the processor 510. The computing system 500 may further include a read-only memory (ROM) 520 or other static storage device coupled to the bus 505 for storing static information and instructions for the processor 510. A storage device 525, such as a solid state device, magnetic disk or optical disk, can be coupled to the bus 505 to persistently store information and instructions. The storage device 525 can include or be part of the data repositories 124 or 144.

The computing system 500 may be coupled via the bus 505 to a display 535, such as a liquid crystal display or active matrix display, for displaying information to a user. An input device 530, such as a keyboard including alphanumeric and other keys, may be coupled to the bus 505 for communicating information and command selections to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535. The display 535 can be part of the data processing system 102, the client devices 104, or other components of FIG. 1, for example.

The processes, systems and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions, or activities; a user's preferences; or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial-access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system," "computing device," "component," or "data processing apparatus" encompass various apparatuses, devices, and machines for processing data, including, by way of example, a programmable processor, a computer, a system on a chip, or multiple ones, or combinations of the foregoing. The apparatus can include special-purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The components of system 100 can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field-programmable gate array) or an ASIC (application-specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 500 can include clients and servers. A client and server are generally remote from each other and typically interact through a communication network (e.g., the network 112). The relationship of client and server arises by virtue of computer programs running on the respective computers and having a client-server relationship to each other. In some implementations, a server transmits data (e.g., data packets representing a content item) to a client device (e.g., for purposes of displaying data to and receiving user input from a user interacting with the client device). Data generated at the client device (e.g., a result of the user interaction) can be received from the client device at the server (e.g., received by the data processing system 102 from the client devices 104.

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 116 and the direct action handler component 120 can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations, elements, or acts of the systems and methods herein referred to in the singular may also embrace implementations including a plurality of these elements, and any references in plural to any implementation, element, or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation or embodiment, and references to "an implementation," "some implementations," "one implementation," or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description, or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed:

1. A system to insert supplemental audio content into primary audio content, comprising:
    a natural language processor component executed on a data processing system to receive, from a client device, a request for an audio recording of a content provider, the audio recording having a content spot marker set by the content provider, the content spot marker specifying a content spot defining a time within the audio recording;
    a content placement component executed on the data processing system to:
        identifying, by a data processing system, a content selection parameter based on an identifier associated with the client device; and
        selecting, by the data processing system, for the content spot of the audio recording, an audio content item from a plurality of audio content items based on the content selection parameter;
    an action handler component executed on the data processing system to:
        insert the audio content item into the content spot of the audio recording specified by the content spot marker;
        generate an action data structure including the audio recording inserted with audio content item at the time defined by the content spot marker; and
        transmit the action data structure to the client device to present the audio recording inserted with the audio content item at the content spot.

2. The system of claim 1, comprising a conversion detection component executed on the data processing system to:
    monitor, subsequent to the transmission of the action data structure, for an interaction event performed via the client device that matches a predefined interaction for the audio content item selected for insertion into the audio recording; and
    determine, responsive to detection of the interaction event from the client device that matches the predefined interaction, that the audio content item inserted into the audio record is listened to via the client device.

3. The system of claim 1, comprising a conversion detection component executed on the data processing system to:
    monitor, subsequent to the transmission of the action data structure, a location within a playback of the audio recording inserted with the audio content item via an application programming interface (API) for an application running on the client device using the identifier, the application to handle the playback of the audio recording; and determine, responsive to the location matching a duration of the audio recording detected via the API, that the playback of the audio recording inserted with the audio content item is complete.

4. The system of claim 1, comprising a conversion detection component executed on the data processing system to:

determine an expected number of client devices from which predefined interaction events for one of plurality of audio content items are to be detected subsequent to playback of the audio recording based on a measured number of client devices from which the predefined interaction events are detected; and determine an expected number of client devices for which the playback of the audio recording inserted with one of the plurality of audio content items is to be completed based on a measured number of client devices from completion of the playback of the audio recording is detected.

5. The system of claim 1, comprising the content placement component to:

establish, using training data, a prediction model to estimate numbers of client devices from which predefined interaction events for one of the plurality of content items are expected to be detected subsequent to playback of audio recordings inserted with one of the plurality of audio content items;

apply the prediction model to the audio recording with the content spot specified by the content spot marker to determine a content spot parameter corresponding to an expected number of client devices on which an interaction event is detected that matches a predefined interaction for each of the plurality of audio content items inserted into the audio recording at the content spot; and select the audio content item of the content provider from the plurality of audio content items based on the content spot parameter for the content spot and a content submission parameter for each of the plurality of audio content items.

6. The system of claim 1, comprising content placement component to:

identify a number of client devices on which an interaction event is detected that matches a predefined interaction for each of the plurality of audio content items inserted into the audio recording at the content spot;

determine a content spot parameter for the content spot defined in the audio recording based on the number of client devices on which the interaction event matches the predefined interaction; and select the audio content item of the content provider from the plurality of audio content items based on the content spot parameter for the content spot and a content submission parameter for each of the plurality of audio content items.

7. The system of claim 1, comprising the content placement component to:

identify a number of client devices for which playback of the audio recording inserted with one of the plurality of audio content items is completed;

determine a content spot parameter for the content spot defined in the audio recording based on the number of client devices for which the playback is completed; and select the audio content item of the content provider from the plurality of audio content items based on the content spot parameter for the content spot and a content submission parameter for each of the plurality of audio content items.

8. The system of claim 1, comprising the content placement component to:

Identify a plurality of content selection parameters including at least one of a device identifier, a cookie identifier associated with a session of the client device, an account identifier used to authenticate an application executing on the client device to playback to the audio recording, and a trait characteristic associated with the account identifier; and select the audio content item from the plurality of audio content items using the plurality of content selection parameters.

9. The system of claim 1, comprising the content placement component to identify the identifier associated with the client device via an application programming interface (API) with an application running on the client device.

10. The system of claim 1, comprising:

the natural language processor component to receive audio data packet including the identifier associated with the client device, the identifier used to authenticate the client device to retrieve the audio recording; and the content placement component to parse the audio data packet to identify the identifier as the content selection parameter.

11. The system of claim 1, comprising a record indexer component to maintain, on a database, the audio recording of the content provider corresponding to at least one audio file to be downloaded on the client device for presentation.

12. The system of claim 1, comprising the action handler component to transmit the action data structure to load the audio recording inserted with the audio content item at the content spot onto the client device without streaming.

13. A method of inserting supplemental audio content into primary audio content, comprising:

receiving, by a natural language processor component executed on a data processing system, a request from a client device for an audio recording of a content provider, the audio recording having a content spot marker set by the content provider, the content spot marker specifying a content spot defining a time within the audio recording;

identifying, by the data processing system, a content selection parameter based on an identifier associated with the client device;

selecting, by the data processing system, for the content spot of the audio recording, an audio content item from a plurality of audio content items based on the content selection parameter;

selecting, by the data processing system, for the content spot of the audio recording, an audio content item of a content provider from a plurality of audio content items using the content selection parameter;

inserting, by the data processing system, the audio content item into the content spot of the audio recording that defines the time specified by the content spot marker;

generating, by the data processing system, an action data structure including the audio recording inserted with audio content item at the time defined by the content spot marker; and transmitting, by the data processing system, the action data structure to the client device to present the audio recording inserted with the audio content item at the content spot.

14. The method of claim 13, comprising:
monitoring, by the data processing system, subsequent to transmitting of the action data structure, for an interaction event performed via the client device that matches a predefined interaction for the audio content item selected for insertion into the audio recording; and
determining, by the data processing system, responsive to detecting of the interaction event from the client device that matches the predefined interaction, that the audio content item inserted into the audio record is listened to via the client device.

15. The method of claim 13, comprising:
monitoring, by the data processing system, subsequent to the transmission of the action data structure, a location within a playback of the audio recording inserted with the audio content item via an application programming interface (API) for an application running on the client device using the identifier, the application to handle the playback of the audio recording; and
determining, by the data processing system, responsive to the location matching a duration of the audio recording detected via the API, that the playback of the audio recording inserted with the audio content item is complete.

16. The method of claim 13, comprising:
establishing, by the data processing system, using training data, a prediction model to estimate numbers of client devices from which predefined interaction events for one of the plurality of content items are expected to be detected subsequent to playback of audio recordings inserted with one of the plurality of audio content items;
applying, by the data processing system, the prediction model to the audio recording with the content spot specified by the content spot marker to determine a content spot parameter corresponding to an expected number of client devices on which an interaction event is detected that matches a predefined interaction for each of the plurality of audio content items inserted into the audio recording at the content spot; and
selecting, by the data processing system, the audio content item of the content provider from the plurality of audio content items based on the content spot parameter for the content spot and a content submission parameter for each of the plurality of audio content items.

17. The method of claim 13, comprising:
identifying, by the data processing system, a number of client devices on which an interaction event is detected that matches a predefined interaction for each of the plurality of audio content items inserted into the audio recording at the content spot;
determining, by the data processing system, a content spot parameter for the content spot defined in the audio recording based on the number of client devices on which the interaction event matches the predefined interaction; and
selecting, by the data processing system, the audio content item of the content provider from the plurality of audio content items based on the content spot parameter for the content spot and a content submission parameter for each of the plurality of audio content items.

18. The method of claim 13, comprising:
identifying, by the data processing system, a number of client devices for which playback of the audio recording inserted with one of the plurality of audio content items is completed;
determining, by the data processing system, a content spot parameter for the content spot defined in the audio recording based on the number of client devices for which the playback is completed; and
selecting, by the data processing system, the audio content item of the content provider from the plurality of audio content items based on the content spot parameter for the content spot and a content submission parameter for each of the plurality of audio content items.

19. The method of claim 13, comprising:
identifying, by the data processing system, a plurality of content selection parameters including at least one of a device identifier, a cookie identifier associated with a session of the client device, an account identifier used to authenticate an application executing on the client device to playback to the audio recording, and a trait characteristic associated with the account identifier; and
selecting, by the data processing system, the audio content item from the plurality of audio content items using the plurality of content selection parameters.

20. The method of claim 13, comprising:
transmitting, by the data processing system, the action data structure to load the audio recording inserted with the audio content item at the content spot onto the client device without streaming.

* * * * *